United States Patent [19]

Renner et al.

[11] 3,925,314

[45] Dec. 9, 1975

[54] STORAGE-STABLE COMPOSITIONS OF POLYIMIDES AND AZOMETHINES

[75] Inventors: Alfred Renner, Munchenstein; Theobald Haug, Frenkendorf, both of Switzerland

[73] Assignee: Ciba-Geigy Corporation, Ardsley, N.Y.

[22] Filed: Sept. 3, 1974

[21] Appl. No.: 503,025

Related U.S. Application Data

[63] Continuation of Ser. No. 381,326, July 20, 1973, abandoned.

[30] Foreign Application Priority Data

Oct. 10, 1972 Switzerland.................... 14888/72

[52] U.S. Cl. ... 260/47 UA; 260/47 CP; 260/78 UA; 260/78 TF
[51] Int. Cl.² ....................................... C08G 73/10
[58] Field of Search....... 260/47 CZ, 47 CP, 47 UA, 260/78 UA, 78 TF

[56] References Cited

UNITED STATES PATENTS

| | | | |
|---|---|---|---|
| 3,625,912 | 12/1971 | Vincent et al. | 260/30.2 |
| 3,642,712 | 2/1972 | Sambeth et al. | 260/78 UA |
| 3,658,764 | 4/1972 | Bargain et al. | 260/78 UA |
| 3,669,930 | 6/1972 | Asahara et al. | 260/47 CZ |
| 3,679,639 | 7/1972 | Bargain et al. | 260/78 UA |
| 3,740,378 | 6/1973 | Crivello | 260/78 UA |

*Primary Examiner*—Lester L. Lee

[57] ABSTRACT

Mixtures which can be cured to give moulded materials having technically very valuable and dielectric properties and which are characterised in that they contain:
 a. Bis-imides or tris-imides of certain unsaturated dicarboxylic acids, such as maleic acid, dimethylmaleic acid, citraconic acid or itaconic acid,
 b. polyamines,
 c. azomethines and optionally
 d. a curing catalyst.

12 Claims, No Drawings

STORAGE-STABLE COMPOSITIONS OF POLYIMIDES AND AZOMETHINES

This is a continuation of application Ser. No. 381,326, filed on July 20, 1973 and now abandoned.

The present invention relates to new, thermosetting and storage-stable mixtures of polyimides of certain unsaturated dicarboxylic acids, polyamines and azomethines, and to a process for the manufacture of mouldings from these new mixtures.

U.S. Pat. No. 2,818,405 describes the manufacture of elastomers from bis-maleimides and certain longchain amines having a molecular weight of between 750 and 12,000. However, these curable mixtures are less suitable for the manufacture of, for example, compression moulding compositions or laminates; furthermore, the heat resistance of the moulded materials manufactured therefrom is not particularly good.

French Pat. No. 1,555,564 furthermore describes the manufacture of products from N,N'-bis-imides of certain unsaturated dicarboxylic acids and di-primary diamines. However, the properties quoted for these products, for example the flexural strength, are only reached after 15 – 50 hours' curing at 200° – 230°C. Whilst these long curing times can be shortened by using pressure, the curing then has to be carried out under a pressure of up to 100 kp/cm². Against this, the moulded materials according to the invention can be manufactured using substantially shorter curing times and without using pressure. As a further advantage, they have a distinctly higher heat distortion point without, as a result, becoming more brittle. The mechanical properties of the moulded materials obtained from the mixtures according to the invention are better than those of the moulded materials obtained according to the French Pat. Specification. In order that a macromolecular moulded material shall have as broad an applicability as possible, it is important that it should display a combination of as many advantageous and valuable properties as possible. For example, a macromolecular moulded material of very high heat resistance is frequently not usable for an industrial application because it can only be converted into industrial products with difficulty or because it possesses other, disadvantageous properties such as, for example, brittleness.

"Tetrahedron" 27, page 2,203 et seq. describes the addition of 2 molecules of a N-substituted maleimide to an azomethine. However, this reaction is rather unfavourable, as is shown by the low yields, which only average 40%. Furthermore, this addition reaction suffers from the disadvantage that it takes place comparatively very slowly. For example, according to the publication cited above, a mixture consisting of N-phenylmaleimide and N,N-dimethylbenzylidene-methylamine will only contain 32% of the adduct to be expected theoretically after 10 hours' continuous heating at 135°.

It has now been found that mixtures of a polyamine and excess polyimide react rapidly and almost quantitatively with the azomethine. Surprisingly, this gives moulded materials, without using pressure or very long curing times and without other difficulties in application, which have valuable and advantageous properties compared with the moulded materials manufactured according to French Pat. No. 1,555,564 from bis-imide and di-primary diamines.

Accordingly, the present invention relates to new, storage-stable, thermosetting mixtures which are characterised in that they contain a. polyimides of certain unsaturated dicarboxylic acids of the general formula I

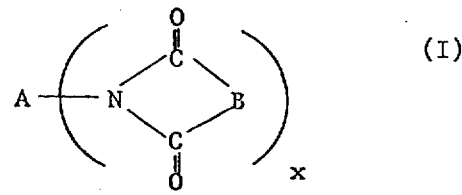

in which A denotes a x-valent organic radical with at least 2 and at most 30 carbon atoms, B represents a radical of the formulae

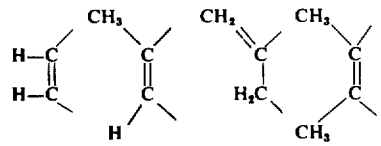

and $x$ denotes the number 2 or 3, b. polyamines of the formula II or III

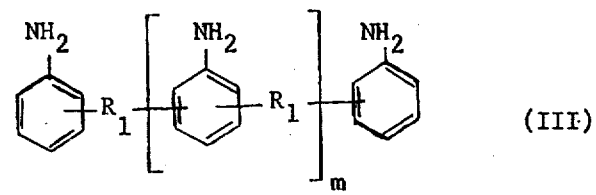

wherein, in the formula II, the radical D denotes a y-valent organic radical with 2 to 40 carbon atoms and $y$ represents an integer from 2 to 4 and wherein, in the formula III, the radicals $R_1$ each denote a divalent hydrocarbon radical of an aldehyde or ketone with 1 to 8 carbon atoms obtained by removal of the oxygen atom and m represents a number from 0.1 to 2, and c. azomethines of the general formulae IV, V or VI

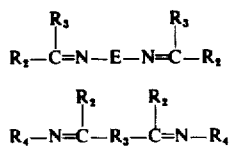 (V)

(VI)

in which $R_2$ denotes a hydrogen atom, a linear or branched aliphatic hydrocarbon radical with up to 12 carbon atoms, a cycloaliphatic or cycloaliphatic-aliphatic hydrocarbon radical with up to 12 carbon atoms, an aromatic radical with 6 – 12 hydrocarbon atoms an araliphatic hydrocarbon radical with up to 20 carbon atoms or a heterocyclic or heterocyclic-aliphatic radical, $R_3$ and $R_4$, with the exception of the meaning of a hydrogen atom, have the same meaning as $R_2$, and $R_3$ together with $R_2$ and with inclusion of the C atom carrying the two substituents can also denote a cycloaliphatic ring system and E denotes a divalent organic radical with at least 2 and at most 30 carbon atoms, and optionally d. a curing catalyst.

Preferably, the mixtures according to the invention contain a. polyimides of the formula I, in which A denotes a radical of the formulae

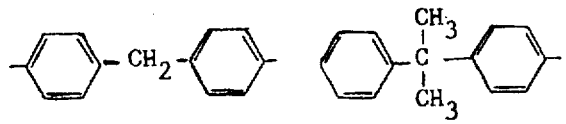

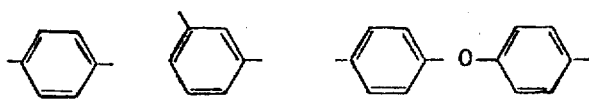

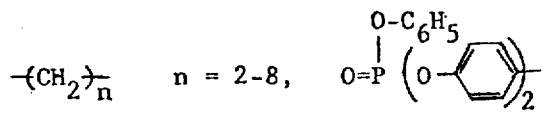

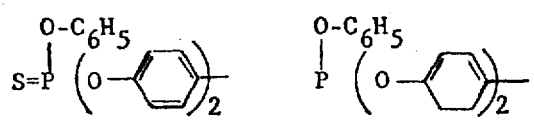

and B denotes the vinylene radical, b. di-primary or tri-primary polyamines of the formula II, wherein D denotes an organic radical with 2 to 40 carbon atoms, and c. azomethines of the formulae IV or V in which $R_2$ denotes a hydrogen atom, $R_3$ and $R_4$ each denote a phenyl radical and E denotes a radical of the formulae

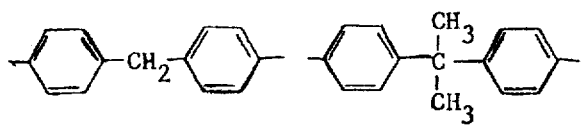

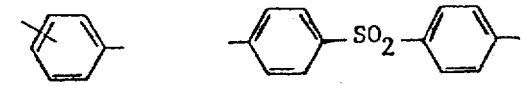

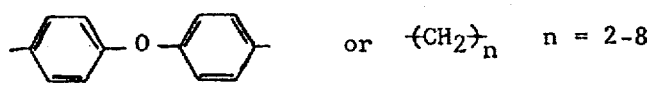

The polyimides of the formula I are a known class of compounds and can be manufactured by using the methods described in U.S. Pat. No. 2,444,536 and in British Pat. Specification No. 1,137,592, by reaction of the corresponding diamines with the unsaturated dicarboxylic acid anhydrides in a polar solvent and in the presence of a catalyst.

The symbol A in the formula I can denote a linear or branched alkylene radical with fewer than 20 carbon atoms, a phenylene radical, a cyclohexylene radical or a radical of the formula

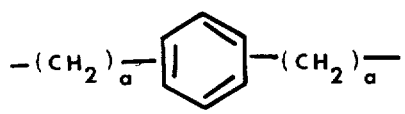

in which a represents an integer from 1 to 3.

The symbol A can also embrace several phenylene or cyclohexylene radicals which are linked directly or through a single valency bond or through an atom or an inert group, such as, for example, oxygen atoms or sulphur atoms, alkylene groups with 1 to 3 carbon atoms or via the following groups: —CO—, —SO$_2$—, —NR— (R=alkyl), —N=N—, —CONH—, —COO—, —CONH—A—NHCO—, O=P(O—)$_3$ and S=P(O—)$_3$.

Furthermore, the various phenylene or cyclohexylene radicals can be substituted by methyl groups.

The symbol A can also represent the grouping bis-citraconimide, N,N'-4,4'-2,2-diphenylpropane-bis-maleimide, N,N'-γ,γ'-1,3-dipropylene-5,5-dimethyl-hydantoin-bis-maleimide, N,N'-4,4'-diphenylmethane-bis-itaconimide, N,N'-p-phenylene-bis-itaconimide, N,N'-4,4'-diphenylmethane-bis-dimethylmaleimide, N,N'-4,4'-2,2-diphenylpropane-bis-dimethylmaleimide, N,N'-hexamethylene-bis-dimethylmaleimide, N,N'-4,4'-diphenylether-bis-dimethylmaleimide, N,N'-4,4'-diphenylsulphone-bis-dimethylmaleimide, the N,N'-bis-maleimide of 4,4'-diamino-triphenyl-phosphate, the N,N'-bis-maleimide of 4,4'-diamino-triphenyl-phosphite, the N,N'-bis-maleimide of 4,4'-diamino-triphenylthiophosphate, the N,N',N''-trismaleimide of tris-(4-aminophenyl)-phosphate, the N,N',N''-trismaleimide of tris-(4-aminophenyl)-phosphite and N,N',N''-trismaleimide of tris-(4-aminophenyl)-thiophosphate.

It is also possible to use mixtures of two or more of these polyimides.

The polyamines of the formulae II and III are known compounds.

If the polyamine of the formula II is a di-primary polyamine, D in the formula II has the same meaning as A in the formula I, and x denotes 2.

As examples of diamines of the formula II there may be mentioned: 4,4'-Diamino-dicyclohexylmethane, 1,4-diamino-cyclohexane, m-phenylenediamine, p-phenylenediamine, 4,4'-diamino-diphenyl-methane, bis-(4-aminophenyl)-2,2-propane, 4,4'-diamino-diphenyl-ether, 4,4'-diaminodiphenylsulphone, 1,5-diamino-naphthalene, m-xylylenediamine, p-

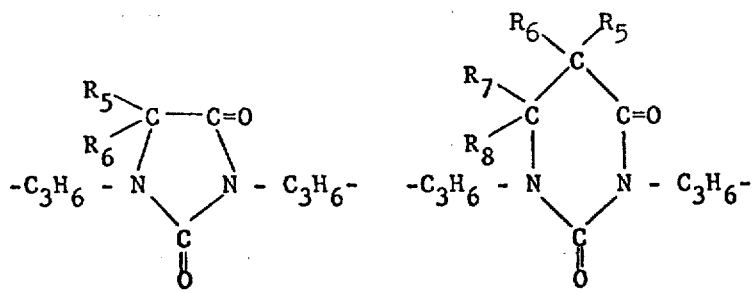

Herein, R$_5$, R$_6$, R$_7$ and R$_8$ denote hydrogen atoms or identical or different aliphatic hydrocarbon radicals with 1 - 6 carbon atoms, and R$_5$ and R$_6$ together with the carbon atom in position 5 can also form a 5-membered or 6-membered aliphatic ring.

As special examples of polyimides of the formula I there may be mentioned: N,N'-Ethylene-bis-maleimide, N,N'-hexamethylene-bis-maleimide, N,N'-m-phenylene-bis-maleimide, N,N'-p-phenylene-bis-maleimide, N,N'-4,4'-diphenylmethane-bis-maleimide, N,N'-4,4'-3,3'-dichloro-diphenylmethane-bis-maleimide, N,N'-4,4'-diphenyl-ether-bis-maleimide, N,N'-4,4'-diphenylsulphone-bis-maleimide, N,N'-4,4'-diclyclohexylmethane-bis-maleimide, N,N'-α,α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phenylene-bis-citraconimide, N,N'-4,4'-diphenylmethanexylylenediamine, ethylene-diamine, hexamethylenediamine, bis-(γ-aminopropyl)-5,5-di-methyl-hydantoin, and 4,4'-diaminotriphenyl phosphate.

The use of m-phenylenediamine, 4,4'-diaminodiphenyl-methane, 4,4'-diamino-diphenyl-ether, hexamethylenediamine, 4,4'-diamino-triphenylphosphate, 4,4'-di-amino-triphenyl-thiophosphate, and 4,4'-diaminotriphenylphosphite is preferred.

Amongst the polyamines of the formula II which differ from the di-primary polyamines of the formula II, those which possess fewer than 40 carbon atoms and have 3 or 4 NH$_2$ groups per molecule are preferably used. The NH$_2$ groups can be substituents on an optionally methyl-substituted benzene ring, naphthalene ring, pyridine ring or triazine ring. They can also be substituents on several benzene rings which are linked to one another by a single valency bond, an atom or an inert group which have already been mentioned under the di-primary polyamines of the formula II, or by one of the following groups

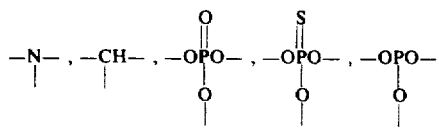

As examples of such polyamines, the following may be mentioned: 1,2,4-Triaminobenzene, 1,3,5-triaminobenzene, 2,4,6-triamino-toluene, 2,4,6-triamino-1,3,5-trimethylbenzene, 1,3,7-triamino-naphthalene, 2,4,4'-triaminodiphenyl, 3,4,6-triaminopyridine, 2,4,4'-triamino-phenyl-ether, 2,4,4'-triaminodiphenylmethane, 2,4,4'-triaminodiphenylsulphone, 2,4,4'-triaminobenzophenone, 2,4,4'-triamino-3-methyldiphenylmethane, N,N,N-tri(4-aminophenyl)-amine, tri-(4-aminophenyl)-methane, tri-(4-aminophenyl)-phosphate, tri-(4-aminophenyl)-phosphite, tri-(4-amino-phenyl)-thiophosphate, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminophenyl-ether, 3,3',4,4'-tetraaminodiphenylmethane, 3,3',4,4'-tetraaminodiphenylsulphone and 3,5-bis-(3,4'-diaminophenyl)-pyridine.

The use of tri-(4-aminophenyl)-phosphate, tri-(4-aminophenyl)-phosphite and tri-(4-amino-phenyl)-thiophosphate or a mixture of these is preferred.

The polyamines of the formula III are also known compounds and can be obtained according to the processes described in French Pat. No. 1,430,977 and 1,481,932 by reaction of primary aromatic amines with aldehydes or ketones.

Aldehydes or ketones used are, for example, formaldehyde, acetaldehyde, benzaldehyde, oenanthaldehyde, acetone, methyl ethyl ketone, cyclohexanone and acetophenone.

The azomethines of the formula IV and V are a known class of compound and are obtained by reacting aldehydes or ketones of the formula

wherein $R_2$ and $R_3$ have the same meaning as in the formulae IV and V, with monoamines of the formula

or diamines of the formula

wherein $R_4$ and E have the same meaning as in the formula IV and V, in equivalent amounts and optionally in the presence of a catalyst.

The azomethines of the formula VI are also known compounds and are manufactured analogously by reacting dialdehydes or diketones of the formula

wherein $R_2$ and $R_3$ have the same meaning as in the formula VI, with monoamines of the formula X in equivalent amounts and optionally in the presence of a catalyst.

The azomethines of the formulae IV, V and VI can be manufactured according to one of the known processes, such as are described in a summarising manner in "Houben-Weyl" Methoden der organischen Chemie (Methods of Organic Chemistry), volume 11/2 (1958), page 73 et seq.

In the azomethines of the formulae IV, V and VI, the radicals $R_2$, $R_3$ and $R_4$ can, where they denote an aliphatic or araliphatic radical, also contain the grouping —O—, —SO$_2$—, —CONH— or —COO— in the hydrocarbon chain. If the radicals $R_2$, $R_3$ and $R_4$ represent aliphatic, aromatic, araliphatic, cycloaliphatic, cycloaliphatic-aliphatic or heterocyclic radicals, these radicals can also be substituted by groups which do not have an adverse influence on the addition mechanism when curing the mixture. As examples of such groups there may be mentioned: Halogen atoms, alkyls, alkoxyls, —NO$_2$, —CON(R)$_2$ or —COOR (R=alkyl) and —SO$_2$. The heterocyclic and heterocyclialiphatic radical can contain the following hetero-atoms or hetero-groups: —O—, —SO$_2$—, —S—, —SO—, and =N— or —NH—. Preferably, the heterocyclic radical denotes a N,N-heterocyclic radical.

The following may be mentioned in particular as carbonyl compounds of the formulae VII and VIII for the manufacture of the azomethines of the formulae IV, V or VI: Acetaldehyde, propionaldehyde, isobutyraldehyde, butyraldehyde, capronaldehyde, caprylaldehyde, caprinaldehyde, tetra-hydrobenzaldehyde, hexahydrobenzaldehyde, furfuraldehyde, benzaldehyde, 2-methyl-benzaldehyde, p-methoxy-benzaldehyde, β-naphthaldehyde, acetone, methyl ethyl ketone, dibutyl ketone, diheptyl ketone, didecyl ketone, dibenzyl ketone, acetophenone, butyrophenone, benzophenone, 2-methylacetophenone, 4-methoxy-propiophenone, cyclopentanone, terephthalaldehyde, isophthalaldehyde, glyoxal, glutaraldehyde and acetonylacetone.

As monoamines of the formula VIII for the manufacture of azomethines of the formula V or VII there may in particular be mentioned: Methylamine, butylamine, iso-butylamine, hexylamine, dodecylamine, cyclohexylamine, benzylamine, aniline, toluidine, α-naphthylamine and β-naphthylamine.

As diamines of the formula IX for the manufacture of the azomethine of the formula V there may in particular be mentioned: Ethylenediamine, 1,6-hexamethylenediamine, 3,3,5-trimethyl-1,6-di-amino-hexane, isophoronediamine, m-phenylene-diamine, p-phenylenediamine, 4,4'-diamino-diphenyl-methane, 3,3'-dichloro-4,4'-diaminodiphenyl-methane, 4,4'-diamino-diphenyl-ether, 4,4'-diamino-diphenyl-sulphone, 4,4'-diamino-dicyclohexyl-methane, m-xylylenediamine, p-xylylenediamine, 4,4'-diamino-1,1'diphenyl-propane and bis-(γ-amino-propyl)-5,5-dimethyl-hydantoin.

As special azomethines there may be mentioned: N,N'-bis-(benzylidene)-hexamethylenediamine, N,N'-bis-(benzylidene)-p-phenylenediamine, N,N'-bis-(benzylidene)-diaminodiphenyl-methane, benzylidene-butylamine and benzalaniline.

The ratio in which the polyimide of the formula I, the polyamines of the formula II or III and the azomethines of the formulae IV, V and VI are mixed can vary over a wide range. The ratio of these 3 components is so chosen that the reaction mixture contains 0.1 to 0.85 equivalent of primary amino group and 0.45 to 0.08 equivalent of >C=N group per 1 equivalent of imide group, with the sum of the equivalents of primary amino group and >C=N group amounting to 0.33 to 1.0 equivalent, preferably 1.0 equivalent, per 1 equivalent of imide group.

The curable mixture can also consist of several different polymides, polyamines, and azomethines.

The mixtures according to the invention are cured by warming them to temperatures between 100° and 280°C, preferably 150° and 250°C, whereupon the mixtures are converted into crosslinked, insoluble and infusible products without releasing volatile reaction products.

It is also possible first to manufacture a prepolymer from the mixtures according to the invention by heating the homogeneously mixed and optionally finely ground starting materials for a period to 50° – 140°C, so that a partially soluble product which is still thermoplastic is produced. This prepolymer may at times have to be ground again to give a processable powder. The prepolymerisation can also be effected by heating a solution or suspension of the starting materials. For this, substances which do not react with the starting materials and which dissolve them sufficiently, if desired, can be used. Examples of such liquids are: Dimethylformamide, tetramethylurea, dimethylsulphoxide, N-methylpyrrolidone, dichloroethylene, tetrachloroethylene, tetrachloroethane, tetrabromoethane, chlorobenzene, dichlorobenzene, bromobenzene, cyclohexanone, dioxane or alkylated aromatic hydrocarbons.

It is furthermore possible first to manufacture a prepolymer from the imide and amine or imide and azomethine, by heating the homogeneously mixed starting materials for a period to 50° – 140°, so that a sufficiently soluble product which is still fusible is produced, which can subsequently be processed and cured with the as yet missing third reactant to give a homogeneous reaction mixture or homogeneous reaction solution.

For some industrial applications, the addition of a curing catalyst is advantageous. The cured state is reached more rapidly by adding, for example, a small amount of an organic peroxide or persalt. For this purpose, compounds such as di-tert.-butyl peroxide, dilauryl peroxide, tert.-butyl cumyl peroxide or tert.-butyl perbenzoate, used in a concentration of 0.01 – 5 per cent, preferably 0.25 – 0.5 per cent, relative to the total weight of the curable mixture, are suitable. It is however also possible to employ other, non-peroxidic, curing accelerators or additives which have a favourable influence on the curing reaction.

The curable mixtures according to the invention are employed above all in the fields of surface protection, the electrical industry, laminating processes and the building industry. They can be used in a formulation suited in each case to the particular application, in the unfilled or filled state, optionally in the form of solutions or dispersions, as lacquers, compression moulding compositions, sintering powders, dipping resins, casting resins, injection moulding formulations, impregnating resins, binders and laminating resins.

Hence, a further subject of the invention is a process for the manufacture of crosslinked, insoluble and infusible plastics products, characterised in that polymides or certain unsaturated carboxylic acids of the formula I, polyamines of the formulae II and/or III and azomethines of the formula IV, V or VI are reacted with one another, optionally in the presence of a curing catalyst, at temperatures between 100° and 280°.

The manufacture, according to the invention, of the crosslinked, infusible products is as a rule carried out with simultaneous shaping to give mouldings, sheet-like structures, laminates or adhesive bonds. For these purposes, the additives customary in the technology of curable plastics, such as fillers, plasticisers, pigments, dyestuffs, mould release agents or flame-retarding substances, can be added. Examples of fillers which can be used are glass fibres, mica, quartz powder, kaolin, colloidal silicon dioxide or metal powders whilst, for example, calcium stearate can serve as the mould release agent. Moulding can be effected by brief, rapid heating to, preferably, 170° – 150°C, under a pressure of 1 – 200 kp/cm². The mouldings thereby produced already possess sufficient mechanical strength so that they can be completely cured outside the press, in an oven at 200° – 280°C.

If a prepolymer is first manufactured from the curable mixtures, the former can be ground to a fine powder and then be used as a surface protection agent by the fluidised bed process.

A solution or suspension of the prepolymer in a suitable solvent can be used for the manufacture of laminates by impregnating porous sheet-like structures such as fabrics, fibre mats or fibre fleeces, especially glass fibre mats or glass fibre fabrics, with solutions or suspensions, and removing the solvent by a drying process. The further curing is carried out in a press, preferably at 170° – 250°C and 5 – 200 kp/cm² pressure. It is also possible merely to precure the laminates in the press and to post-cure the products thus obtained in an oven at 200° – 280°C until optimum use properties are achieved.

EXAMPLE 1

71.6 g (0.20 mol) of N,N'-4,4'-diaminodiphenylmethane-bis-maleimide (referred to for brevity as "bis-imide I" in the examples which follow), 9.9 g (0.026 mol) of tri-(4-aminophenyl)-phosphate and 23.5 g (0.08 mol) of N,N'-bis-(benzylidene)-hexamethylenediamine were well mixed, fused in an oil bath at 160°C and degassed in vacuo at 15 mm Hg. The clear melt was poured into a mould of size 150 × 150 × 4 mm and cured for two hours at 160°C, 2 hours at 180°C and 2 hours at 200°C. The properties of the cured moulding article are shown in Table 1 and 2.

EXAMPLE 2

143.6 g (0.234 mol) of N,N',N''-tris-maleimide o tri-(4-aminophenyl)-phosphate (referred to for brevity as "bis-imide II" in the examples which follow), 9.3 g (0.047 mol) of 4,4'-diamino-diphenylmethane and 57.1 g (0.152 mol) of N,N'-bis-(benzylidene)-p phenylenediamine are well mixed, fused in an oil bath at 180°C and degassed in a vacuum of 15 mm Hg. The clear melt was cured for 3 hours at 180°C and 3 hour at 200°C in a similar mould to that in Example 1. Th properties of the cured article are shown in Table 1 and 2.

EXAMPLE 3

73.0 g (0.204 mol) of "bis-imide I", 8.1 g (0.04 mol) of 4,4'-diaminodiphenylmethane and 23.9 (0.082 mol) of N,N'-bis-(benzylidene)-hexame thylenediamine were well mixed, fused in an oil bath a 160°C and degassed in a vacuum at 15 mm Hg. Th clear melt was converted into a cured moulding in the same way as in Example 1, and the properties of the moulding are shown in Table 1 and 2.

EXAMPLE 4

60.7 g (0.169 mol) of "bis-imide I", 13.6 g (0.069 mol) of 4,4'-diaminodiphenylmethane and 20.7 g (0.051 mol) of N,N'-bis-(benzylidene)-hexanediol-1,6-di-(γ-aminopropyl)-ether were well mixed, fused in a round flask at 160°C and degassed. The clear melt was cast and cured as in Example 1. The test data of the resulting moulding are shown in Table 1.

EXAMPLE 5

63.6 g (0.178 mol) of "bis-imide I", 14.1 g (0.071 mol) of 4,4'-diaminodephenylmethane and 22.3 g (0.053 mol) of N,N'-bis-(benzylidene)-1,3-di-(γ-aminopropyl)-5,5-dimethylhydantoin were well mixed in a round flask, fused at 160°C and degassed. The clear melt was cast and cured as in Example 1. The test data of the resulting moulding are shown in Table 1.

EXAMPLE 6

65.2 g (0.20 mol) of N,N'-4,4'-diaminophenyl-ether-bis-maleimide, 14.35 g (0.073 mol) of N,N'-4,4'-diaminodiphenylmethane and 20.45 g (0.055 mol) of N,N'-bis-(benzylidene)-diaminodiphenylmethane were well mixed in a round flask, fused at 160°C and degassed. The clear melt was cast and cured as in Example 1. The test data of the resulting moulding are shown in Table 1.

EXAMPLE 7

70.5 g (0.197 mol) of "bis-imide I", 15.6 g (0.079 mol) of 4,4'-diaminodiphenylmethane and 13.9 g (0.059 mol) of N,N'-bis-(benzylidene)-ethylenediamine were well mixed in a round flask, fused at 160°C and degassed. The clear melt was cast and cured as in Example 1. The test data of the resulting moulding are shown in Table 1.

EXAMPLE 8

65.1 g (0.182 mol) of "bis-imide I", 14.4 g (0.073 mol) of 4,4'-diaminodiphenylmethane and 20.5 g (0.55 mol of N,N'-bis-(benzylidene)-4,4'-diaminodiphenyl-ether were well mixed in a round flask, fused at 160°C and degassed. The clear melt was cast and cured as in Example 1. The test data of the resulting moulding are shown in Table 1.

EXAMPLE 9

62.8 g (0.175 mol) of "bis-imide I", 13.9 g (0.07 mol) of 4,4'-diaminodiphenylmethane and 23.3 g (0.0525 mol) of N,N'-bis-(benzylidene)-4,4'-diamino-3,3'-dichlorodiphenylmethane were well mixed in a round flask, fused at 160°C and degassed. The clear melt was cast and cured as in Example 1. The test data of the resulting moulding are shown in Table 1.

EXAMPLE 10

71.4 g (0.116 mol) of "bis-imide II", 8.7 g (0.023 mol) of tri-(4-aminophenyl)-phosphate and 19.9 g (0.070 mol) of N,N'-bis-(benzylidene)-p-phenylenediamine were well mixed in a round flask, fused at 160°C and degassed. The clear melt was cast and cured as in Example 1. The test data of the resulting moulding are shown in Table 1.

EXAMPLE 11

75.0 g (0.21 mol) of "bis-imide I", 16.6 g (0.084 mol) of 4,4'-diaminodiphenylmethane and 18.4 g (0.063 mol) of N,N'-bis-(benzylidene)-hexamethylenediamine were mixed, fused at 180°C, degassed and cast and cured as in Example 1. The test data of the moulding are shown in Table 1.

EXAMPLE 12

215 g (0.60 mol) of "bis-imide I", 47.0 g (0.235 mol) of 4,4'-diaminodiphenylmethane and 67.5 g (0.18 mol) of N,N'-bis-(benzylidene)-diaminodiphenylmethane were well mixed in a round flask, fused at 160°C and degassed. The clear melt is poured into moulds of sizes 150 × 150 × 4 mm and 150 × 150 × 2 mm and cured as in Example 1. The test data of the mouldings are shown in Table 1.

EXAMPLE 13

69.5 g (0.194 mol) of "bis-imide I", 18.7 g (0.05 mol) of tri-(4-aminophenyl)-phosphate and 21.8 g (0.075 mol) of N,N'-bis-(benzylidene)-diaminodiphenylmethane were mixed as in Example 1, fused, degassed, cast and cured. The test data of the moulding are shown in Table 1.

EXAMPLE 14

66.7 g (0.186 mol) of "bis-imide I", 14.7 g (0.074 mol) of 4,4'-diaminodiphenylmethane, 8.2 g (0.028 mol) of N,N'-bis-(benzylidene)-hexamethylenediamine and 10.5 g (0.028 mol) of N,N'-bis-(benzylidene)-diaminodiphenylmethane were mixed as in Example 1, fused, degassed, cast and cured. The test data of the moulding are shown in Table 1.

EXAMPLE 15

66.7 g (0.186 mol) of "bis-imide I", 7.35 g (0.037 mol) of diaminodiphenylmethane, 7.35 g (0.037 mol) of 4,4'-diamino-diphenyl-ether, 8.2 g (0.028 mol) of N,N'-bis-(benzylidene)-hexamethylenediamine and 10.45 g (0.028 mol) of N,N'-benzylidene-diaminodiphenylmethane were mixed as in Example 1, fused, degassed, cast and cured. The test data of the moulding are shown in Table 1.

EXAMPLE 16

74.2 g (0.208 mol) of "bis-imide I", 16.4 g (0.083 mol) of 4,4'-diaminodiphenylmethane and 19.4 g (0.062 mol) of N,N'-bis-(benzylidene)-p-xylylenediamine were mixed as in Example 1, fused, degassed, cast and cured. The test data of the moulding are shown in Table 1.

EXAMPLE 17

68.6 g (0.192 mol) of "bis-imide I", 7.6 g (0.038 mol) of 4,4'-diaminodiphenylmethane and 28.8 g (0.077 mol) of N,N'-bis-(benzylidene)-diaminodiphenylmethane were cured as in Example 1 to give a moulding of which the test data are shown in Table 2 and 3.

EXAMPLE 18

206.4 g (0.575 mol) of "bis-imide I", 42.6 g (0.116 mol) of tri-(4-aminophenyl)-phosphate and 75.0 g (0.20 mol) of N,N'-bis-(benzylidene)-diaminodiphenylmethane were cured as in Example 1 to give mouldings of which the test data shown in Table 3.

EXAMPLE 19

215 g (0.60 mol) of "bis-imide I", 47 g (0.237 mol) of 4,4'-diaminodiphenylmethane and 67.5 g (0.18 mol) of N,N-bis-(benzylidene)-diaminodiphenylmethane were cured as in Example 1 to give mouldings of which the test data are shown in Table 3.

COMPARISON EXAMPLE

In accordance with French Pat. No. 1,555,564, 72.0 g (0.20 mol) of "bis-imide I", and 19.8 g (0.10 mol) of 4,4'-diaminodiphenylmethane were mixed, fused, degassed and cast and cured for 1.5 hours at 140°C, 1.5 hours at 160°C, 1.5 hours at 180°C and 1.5 hours at 200°C. The test data are shown in Table 1.

Tables 2 and 3 contain electrical characteristic data of the mouldings manufactured according to the invention. The tables show the very good properties, which remain largely unchanged under the prolonged action of water or elevated temperature.

EXAMPLE 20

6.50 g of "bis-imide I", 1.45 g of 4,4'-diaminodiphenylmethane and 2.05 g of N,N'-bis-(benzylidene)-diaminodiphenylmethane were well mixed and cured in a rectangular frame of 1 mm thick polytetrafluoroethylene ("Teflon") between two 1 mm thick Teflon layers in a press at 180°C, under a light pressure of less than 5 atmospheres, for 15 minutes, to give a 1 mm thick moulding which was additionally post-cured for

TABLE 1

| Moulding according to | Flexural strength according to VSM[*]77,103 (kg/mm$^2$) | Impact strength according to VSM 77,105 (cmkg/cm$^2$) | Heat distortion point according to ISO/R[**] 75 (°C) |
|---|---|---|---|
| Example 1 | 11.0 | 12.5 | 240 |
| 2 | 10.5 | 7.8 | 229 |
| 3 | 13.0 | 12.6 | 246 |
| 4 | 10.3 | 14.3 | 168 |
| 5 | 11.7 | 11.7 | 224 |
| 6 | 9.1 | 10.9 | 219 |
| 7 | 10.1 | 7.9 | 228 |
| 8 | 9.5 | 9.5 | 215 |
| 9 | 9.1 | 7.6 | 226 |
| 10 | 12.3 | 8.6 | 230 |
| 11 | 13.1 | 15.7 | 237 |
| 12 | 10.6 | 10.0 | 227 |
| 13 | 12.1 | 9.8 | 231 |
| 14 | 11.1 | 11.9 | 220 |
| 15 | 10.7 | 10.5 | 222 |
| 16 | 11.7 | 10.0 | 233 |
| Comparison example | 9.2 | 6.9 | 209 |

[*]VSM = Standard specifications of the Verein Schweizerischer Maschineindustrieller
[**]ISO/R = Standard specifications of the International Standard Organization/Recommendation

TABLE 2

| | Dielectric loss factor tg$\delta \times 10^2$ at $10^6$ Hz | | Dielectric constant $\epsilon$ at $10^6$Hz | | Specific volume resistance $\Omega$ | |
|---|---|---|---|---|---|---|
| | Initial value | After 30 days' storage in H$_2$O at 23°C | Initial value | After 30 days' storage in H$_2$O at 23°C | Initial value | After 30 days' storage in H$_2$O at 23°C |
| Example 1 | 1.56 | 2.85 | 3.7 | 4.0 | 6.5×10$^{16}$ | 5.3×10$^{15}$ |
| Example 2 | 1.24 | 2.33 | 3.8 | 4.2 | 7.6×10$^{16}$ | 4.2×10$^{15}$ |
| Example 3 | 0.27 | 0.53 | 3.6 | 4.3 | 5.6×10$^{16}$ | 4.4×10$^{15}$ |
| Example 17 | 0.17 | 0.32 | 3.5 | 4.0 | 1.1×10$^{17}$ | 1.2×10$^{16}$ |

TABLE 3

| | Dielectric loss factor tg $\delta \times 10^2$ at 50 Hz and | | | Dielectric constant $\epsilon$ at 50 Hz and | | | Specific volume resistance $\Omega$ at | | |
|---|---|---|---|---|---|---|---|---|---|
| | 23°C | 160°C | 200°C | 23°C | 160°C | 200°C | 23°C | 160°C | 200°C |
| Example 17 | 0.20 | 0.28 | 0.28 | 3.5 | 3.4 | 3.3 | 10$^{16}$ | 1.0×10$^{15}$ | 10$^{15}$ |
| Example 18 | 0.19 | 0.27 | 0.51 | 3.4 | 3.4 | 3.4 | 5.3×10$^{15}$ | 1.2×10$^{15}$ | 4.8×10$^{13}$ |
| Example 19 | 0.23 | 0.28 | 0.40 | 3.4 | 3.3 | 3.3 | 9.8×10$^{15}$ | 7.5×10$^{14}$ | 9.0×10$^{13}$ |

Table 1 shows the valuable properties of the mouldings manufactured from the curable mixtures according to the invention, which are distinctly better than the mouldings manufactured according to French Pat. No. 1,555,564. Above all, the mouldings manufactured from the mixtures according to the invention are distinguished by better impact strength and a higher heat distortion point. Furthermore, these advantageous properties of the mouldings according to the invention are achieved after substantially shorter curing times and without the use of pressure.

24 hours at 200°C. The properties of the resulting moulding are shown in Table 4.

EXAMPLE 21

A mixture was manufactured as in Example 20 bu 0.1 g of tert.-butyl perbenzoate was also added theretc This mixture was cured as in Example 20 to give moulding of which the properties are shown in Table 4

EXAMPLE 22

7.16 g of "bis-imide I", 2.12 g of N,N'-bis-furfurylidene)-4,4'-diaminodiphenylmethane and 2.12 of 3,3'-dichloro-4,4'-diaminodiphenylmethane were mixed and cured as in Example 20 to give a moulding of which the properties are shown in Table 4.

EXAMPLE 23

5.68 g of N,N'-m-phenylene-bis-maleimide, 1.70 g of terephthaldianil and 1.58 g of 4,4'-diaminodiphenylmethane were cured as in Example 20 to give a moulding of which the properties are shown in Table 4.

EXAMPLE 24

7.16 g of "bis-imide I", 2.24 g of N,N'-bis-(benzylidene)-4,4'-diaminodiphenylmethane, 0.46 g of 1,6-hexamethylenediamine and 0.35 g of piperazine were cured as in Example 20 to give a moulding of which the properties are shown in Table 4.

EXAMPLE 25

7.44 g of N,N'-4,4'-diaminodiphenylmethane-bis-citraconimide, 1.70 g of terephthal-dianil and 1.58 g of 4,4'-diaminodiphenylmethane were cured as in Example 20 to give a moulding of which the properties are shown in Table 4.

EXAMPLE 26

3.58 g of "bis-imide I", 0.99 g of tris-(4-aminophenyl)-phosphate and 1.12 g of N,N'-bis-(benzylidene)-4,4'-diaminodiphenylmethane were cured as in Example 20 to give a moulding of which the properties are shown in Table 4.

The mouldings manufactured in Examples 20 – 26 were subjected to a thermogravimetric test. The thermogravimetric analysis was carried out in dry air using the "Recording Vacuum Thermoanalyzer TA-1" instrument of Messrs. Mettler, with a sample of 50 mg and a speed of heating of 2°C/minute. In the thermogravimetric analysis, a curve of the weight of the sample as a function of the temperature is recorded ("thermogravimetric curve") and at the same time the first derivative of this thermogravimetric curve ("differentiated thermogravimetric curve") is drawn. The temperature of maximum speed of evaporation is the point of maximum slope of the thermogravimetric curve; at this temperature, the differentiated thermogravimetric curve shows a maximum. The proportion by weight which corresponds to the zone between two minima of the differentiated thermogravimetric curve is described as a fraction. The results of measurements by this method of investigation are shown in Table 4.

We claim:
1. A storage-stable, thermosetting composition of matter, which comprises
   a. polyimides of certain unsaturated dicarboxylic acids of the general formula I

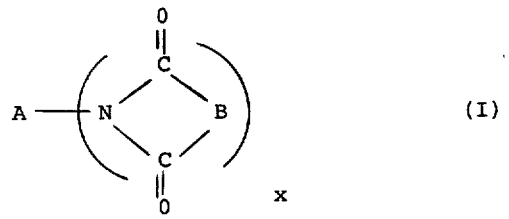

in which A denotes a x-valent organic radical with at least 2 and at most 30 carbon atoms, B represents a radical selected from the formula consisting of

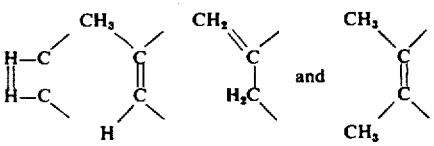

and x denotes the number 2 or 3,
   b. polyamines of the formula II or III

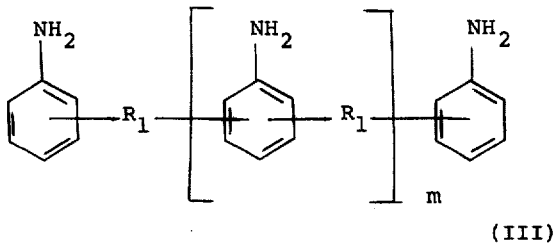

wherein, in the formula II, the radical D denotes a y-valent organic radical with 2 to 40 carbon atoms and y represents an integer from 2 to 4 and wherein, in the formula III, the radicals $R_1$ each denote a divalent hydrocarbon radical of an aldehyde or ketone with 1 to 8 carbon atoms obtained by removal of the oxygen atom

Table 4

| Moulding according to | Thermogravimetric analysis of the mouldings | | | | | | Weight loss, 1% per minute at °C |
|---|---|---|---|---|---|---|---|
| | Maximum speed of decomposition (°C) | | | Proportion of the fractions (%) | | | |
| | Fraction | | | | | | |
| | 1 | 2 | 3 | 1 | 2 | 3 | |
| Example 20 | approx. 100 | 400 | 630 | 1.0 | 25.2 | 73.8 | 312 |
| 21 | approx. 110 | 420 | 624 | 1.1 | 25.7 | 73.2 | 338 |
| 22 | approx. 50 | 515 | 600 | 2.4 | 44.1 | 53.5 | 333 |
| 23 | approx. 130 | 396 | 596 | 1.0 | 22.8 | 76.2 | 324 |
| 24 | approx. 80 | 398 | 610 | 1.2 | 29.7 | 69.1 | 324 |
| 25 | approx. 130 | 427 | 613 | 0.7 | 29.3 | 70.0 | 342 |
| 26 | approx. 120 | 410 | 605 | 0.6 | 28.0 | 71.4 | 326 |

Table 4 shows that the mouldings of Examples 20 to 26 only begin to decompose above 310°C (weight loss 1%° per minute). The first maxima of the speed of decomposition, which are at not less than 396°C, are also very high, and the corresponding proportion by weight, namely approx. 30%, is relatively small.

and m represents a number from 0.1 to 2, and
c. azomethines of the general formulae IV, V or VI

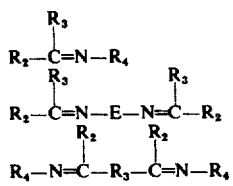

in which $R_2$ denotes a hydrogen atom, a linear or branched aliphatic hydrocarbon radical with up to 12 carbon atoms, a cycloaliphatic or cycloaliphatic-aliphatic hydrocarbon radical with up to 12 carbon atoms, an aromatic radical with 6 – 12 hydrocarbon atoms, an araliphatic hydrocarbon radical with up to 20 carbon atoms or a heterocyclic radical, $R_3$ and $R_4$, with the exception of the meaning of a hydrogen atom, have the same meaning as $R_2$, and $R_3$ together with $R_2$ and with inclusion of the C atom carrying the two substituents can also denote a cycloaliphatic ring system and E denotes a divalent organic radical with at least 2 and at most 30 carbon atoms, the ratio of components (a), (b) and (c) being so chosen that the composition contains 0.1 to 0.85 equivalent of primary amino group and 0.45 to 0.08 equivalent of >C=N group per 1 equivalent of imide group, with the sum of the equivalents of primary amino group and >C=N group amounting to 0.33 to 1 equivalent per 1 equivalent of imide group.

2. A composition according to claim 1, which comprises
a. polyimides of the formula I, in which A denotes a radical selected from the formula consisting of

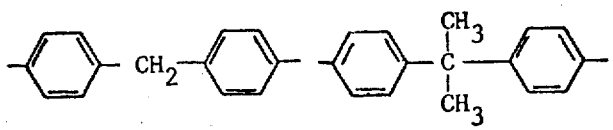

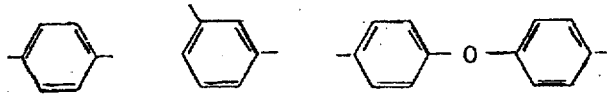

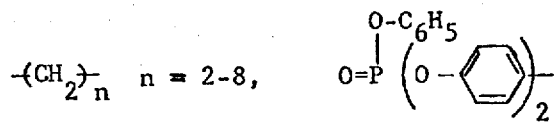

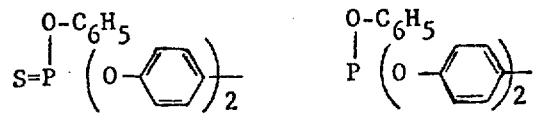

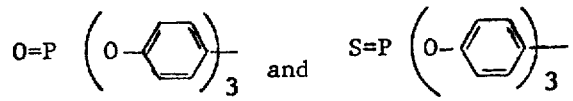

and B denotes the vinylene radical,
b. di-primary or tri-primary polyamines of the formula II, wherein D denotes an organic radical with 2 to 40 carbon atoms, and
c. azomethines of the formulae IV or V in which $R_2$ denotes a hydrogen atom, $R_3$ and $R_4$ each denote a phenyl radical and E denotes a radical selected from the formula consisting of

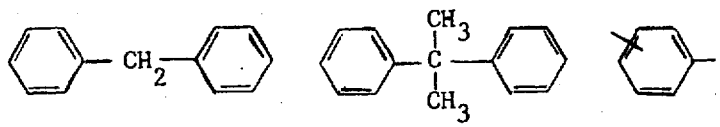

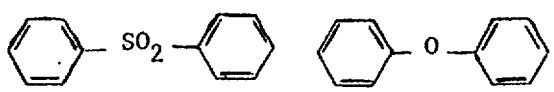

and

 n = 2-8

3. A composition according to claim 1, characterised in that the sum of the equivalents of primary amino group and >C=N group amounts to 1.0 equivalent per 1 equivalent of imide group.

4. A composition according to claim 1, which comprises N,N'-4,4'-diaminodiphenylmethane-bis-maleimide as the polyimide of the formula I.

5. A composition according to claim 1, which comprises a tris-maleimide of the formula

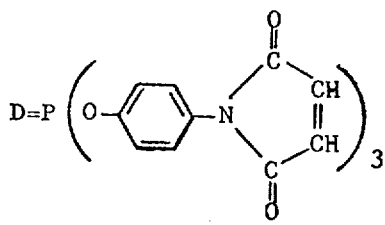

wherein D denotes an oxygen atom or sulphur atom, as the polyimides of the formula I.

6. A composition according to claim 1, which comprises N,N'-4,4'-diaminophenyl-ether-bis-maleimide, N,N'-m-phenylene-bis-maleimide or N,N'-4,4'-diaminodiphenylmethane-bis-citraconimide as the polyimide of the formula I.

7. A composition according to claim 1, which comprises 4,4'-diaminodiphenylmethane or tri-(b 4-aminophenyl)-phosphate as the polyamine of the formula II.

8. A composition according to claim 1, which comprises 4,4'-diaminodiphenyl-ether, 3,3'-dichloro-4,4'-diaminodiphenylmethane or hexamethylenediamine as the polyamine of the formula II.

9. A composition according to claim 1, which comprises N,N'-bis-(benzylidene)-hexamethylenediamine or N,N'-bis-(benzylidene)-p-phenylenediamine as the azomethine.

10. A composition according to claim 1, which comprises a member selected from the group consisting of N,N'-bis-(benzylidene)-hexanediol-1,6-di-(γ-aminopropyl)-ether, N,N'-bis(benzylidene)-1,3-(γ-aminopropyl)-5,5-dimethylhydantoin, N,N'-bis-(benzylidene)-ethylenediamine, N,N'-bis-(benzylidene)-4,4'-diaminodiphenyl-ether, N,N'-bis-(benzylidene)-4,4'-diamino-3,3'-dichlorodiphenylmethane, N,N'-bis-(benzylidene)-p-xylylenediamine, N,N'-bis(furfurylidene)-4,4'-diaminodiphenylmethane and terephthaldianil as the azomethine.

11. A composition according to claim 1, wherein additionally 0.01 to 5% of a curing catalyst is present by weight of the total curable mixture.

12. A composition according to claim 11, which comprises tert.-butyl perbenzoate as the curing catalyst.

* * * * *

UNITED STATES PATENT OFFICE
CERTIFICATE OF CORRECTION

Patent No. 3,925,314　　　　　Dated Dec. 9, 1975

Inventor(s) Alfred Renner and Theobold Haug

It is certified that error appears in the above-identified patent and that said Letters Patent are hereby corrected as shown below:

Claim 7, column 20, line 5 "tri-(b 4-amino-" should read

--tri-(4-amino- --

Signed and Sealed this

Fourteenth Day of June 1977

[SEAL]

Attest:

RUTH C. MASON
*Attesting Officer*

C. MARSHALL DANN
*Commissioner of Patents and Trademarks*